(12) United States Patent
Crowther

(10) Patent No.: US 10,516,664 B2
(45) Date of Patent: Dec. 24, 2019

(54) NETWORK ACCESS SECURITY SYSTEM AND METHOD

(71) Applicant: KASADA PTY LTD, New South Wales (AU)

(72) Inventor: Samuel John Crowther, Valentine (AU)

(73) Assignee: KASADA PTY LTD, New South Wales (AU)

(*) Notice: Subject to any disclaimer, the term of this patent is extended or adjusted under 35 U.S.C. 154(b) by 65 days.

(21) Appl. No.: 15/106,525

(22) PCT Filed: Dec. 24, 2014

(86) PCT No.: PCT/AU2014/001165
§ 371 (c)(1),
(2) Date: Jun. 20, 2016

(87) PCT Pub. No.: WO2015/095919
PCT Pub. Date: Jul. 2, 2015

(65) Prior Publication Data
US 2016/0373439 A1    Dec. 22, 2016

(30) Foreign Application Priority Data

Dec. 24, 2013   (AU) ................................ 2013905066

(51) Int. Cl.
*H04L 29/06*        (2006.01)
*G06F 21/36*        (2013.01)
(Continued)

(52) U.S. Cl.
CPC .......... *H04L 63/0861* (2013.01); *G06F 21/32* (2013.01); *G06F 21/36* (2013.01);
(Continued)

(58) Field of Classification Search
CPC .......... G06F 21/31; G06F 21/32; G06F 21/36; H04L 63/083; H04L 63/08; H04L 63/0861; H04L 63/0442; H04L 9/3242
(Continued)

(56) References Cited

U.S. PATENT DOCUMENTS

2004/0056967 A1* 3/2004 Ito ...................... H04N 1/32128
                                                            348/231.2
2006/0248348 A1* 11/2006 Wakao ............... H04N 1/32101
                                                              713/186
(Continued)

OTHER PUBLICATIONS

Preneel, Bart, René Govaerts, and Joos Vandewalle. "Hash functions based on block ciphers: A synthetic approach." Annual International Cryptology Conference. Springer, Berlin, Heidelberg, 1993 (Year: 1993).*

(Continued)

*Primary Examiner* — Syed A Zaidi
(74) *Attorney, Agent, or Firm* — James F. Goedken

(57) ABSTRACT

A method of providing for access to a computer resource, the method including the steps of: (a) providing an initial registration process including the identification and downloading of a user selected candidate image; (b) creating a first derived identifier from the candidate image; (c) upon a user requesting access to the computer resource, requesting from the user a second candidate image, and deriving a second derived identifier from the second candidate image; and (d) comparing the first and second derived identifier and where they are equivalent, granting the user access to the computer resource.

3 Claims, 3 Drawing Sheets

(51) Int. Cl.
  *G06F 21/32* (2013.01)
  *H04L 9/32* (2006.01)
(52) U.S. Cl.
  CPC ........ *H04L 9/3242* (2013.01); *H04L 63/0442* (2013.01); *H04L 63/061* (2013.01); *H04L 63/102* (2013.01)
(58) Field of Classification Search
  USPC .......................................................... 713/171
  See application file for complete search history.

(56) References Cited

U.S. PATENT DOCUMENTS

2007/0074119 A1* 3/2007 Komine .................. G06F 21/36
                                                       715/743
2010/0180336 A1   7/2010 Jones et al.
2012/0005483 A1   1/2012 Patvarczki et al.
2013/0279765 A1* 10/2013 Fondeur .................. G06F 21/31
                                                       382/115

OTHER PUBLICATIONS

Ordean, Mihai et al. "Catch me if you can: Using Self-Camouflaging Images to Strengthen Graphical Passwords." 2012 IEEE International Conference on Intelligent Computer Communication and Processing (ICCP), Aug. 30, 2012, pp. 309-315.

* cited by examiner

NETWORK ACCESS SECURITY SYSTEM AND METHOD

FIELD OF THE INVENTION

The present invention relates to the field of providing secure access to computational resources. In particular, the present invention discloses an imaged based access system for utilising in accessing computer resources in a secure manner.

BACKGROUND

Any discussion of the background art throughout the specification should in no way be considered as an admission that such art is widely known or forms part of common general knowledge in the field.

Secure user interface access to computer type resources is becoming a significant problem within society. Different techniques have been utilised for providing secure user interface access. One very common technique is the password access technique, when the user is required to remember passwords for accessing a computer resource. This can lead to a number of significant problems where the number of passwords is substantial, with each password being difficult to remember or guess.

Other forms of security access to systems can include fingerprint identification, voice identification, and face recognition. These techniques often require specialised hardware which limits their general applicability and usefulness in overall computer environments.

SUMMARY OF THE INVENTION

It is an object of the present invention to provide an alternative form of secure user interface access for accessing computer resources or the like.

In accordance with a first aspect of the present invention there is provided a method of providing for access to a computer resource, the method including the steps of: (a) providing an initial registration process including the identification and downloading of a user selected candidate image; (b) creating a first derived identifier from the candidate image; (c) upon a user requesting access to the computer resource, requesting from the user a second candidate image, and deriving a second derived identifier from the second candidate image; and (d) comparing the first and second derived identifier and where they are equivalent, granting the user access to the computer resource.

The first derived identifier can comprise a hash value derived from the application of a cryptographic encoding of the image. The cryptographic encoding preferably can include SHA-512, SHA-256 hashing or any other asymmetric hashing algorithm. The computer resource can be access over a network environment.

In accordance with a further aspect of the present invention there is provided a system for the provision of user access to a computer resource, the system including: a first registration unit adapted to receive a request for registration from users, including the downloading of a first access image from the user, and the derivation of an first derived identifier there from; and a second access unit adapted to receive a request for access to the computer resource, in addition to a second access image and to compute a second derived identifier there from, and to grant access to the computer resource when the first derived identifier and the second derived identifier are equivalent.

In accordance with another aspect of the present invention, there is provided, a method of providing for access to a computer resource, over a networked environment, the method including the steps of: (a) providing an initial registration process including identification of a user selected data structure; (b) applying a hashing function to the user selected data structure to produce a first derived identifier; (c) transmitting and securely storing the first derived identifier at a server location; and (d) upon a user requesting access to the computer resource, requesting from the user a copy of the user selected data structure, deriving a second derived identifier from the copy of the user selected data structure and comparing the first and second derived identifier, and, where they are equivalent, granting the user access to the computer resource.

Preferably, the hashing function is an asymmetric hash function, and the user selected data structure comprises a user selected stored image.

In accordance with a further aspect of the present invention there is provided a method of providing for access to a computer resource server, over a networked environment, the method including the steps of: providing an initial registration process including identification of a user selected data structure; distributing a one time use data structure to a user and the computer resource server; modulating the user selected data structure with the one time use data and applying a cryptographic hashing function to the modulated user selected data structure to produce a first derived identifier and a current modulation key; transmitting and securely storing the first derived identifier and current modulation key to the computer resource server; and upon a user requesting access to the computer resource, requesting from the user, said first derived identifier and current modulation key, and utilising said stored one time use data structure and current modulation key and stored copy of the user selected data structure to independently derive a second derived identifier, and comparing the first and second derived identifier, and, where they are equivalent, granting the user access to the computer resource.

BRIEF DESCRIPTION OF THE DRAWINGS

Embodiments of the invention will now be described, by way of example only, with reference to the accompanying drawings in which.

DETAILED DESCRIPTION

The preferred embodiment provides for an alternative user interface for allowing access to secured resources. In one embodiment, the preferred embodiment is presented as a program for authenticating users seeking to access password-protected websites over a network infrastructure such as a Wi-Fi network.

The preferred embodiment replaces the popular method of entering a username and password. In the preferred embodiments the user undertakes the entry of a user nominated photograph which is utilised as part of the preferential access mechanism.

Figure 1:
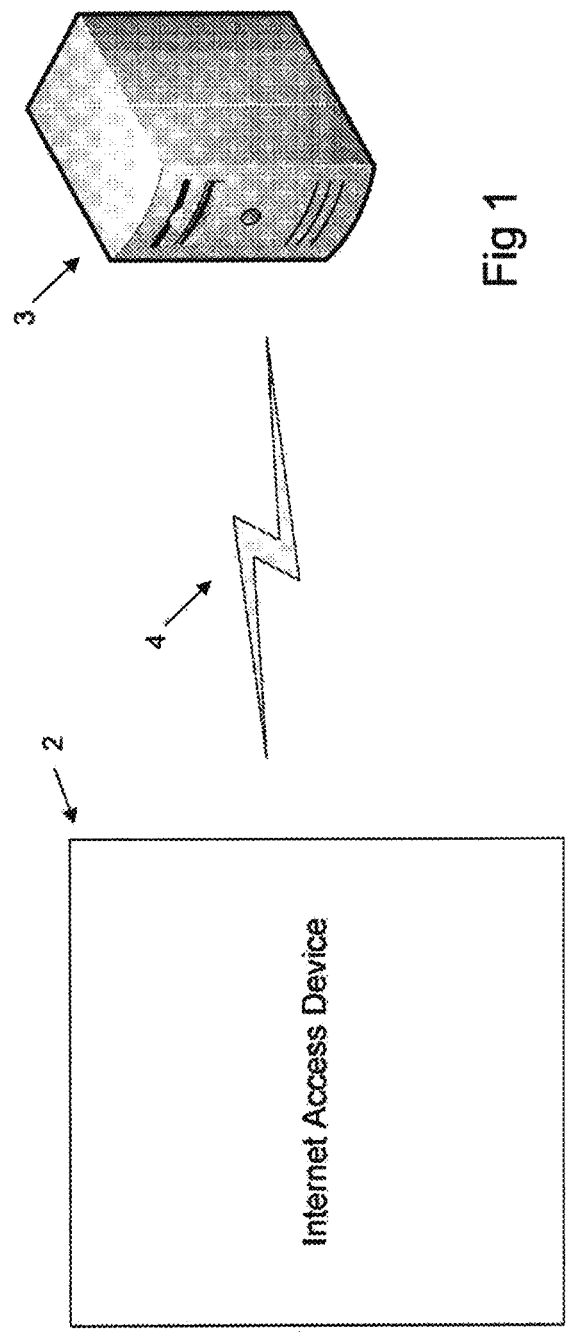
FIG. 1 illustrates schematically an operational environment of the preferred embodiment.

Turning initially to FIG. 1, there is illustrated the operational environment of the preferred embodiment 1. In this arrangement 1, secure access is provided to an Internet-based resource 3. The user utilises an Internet access device 2 which could comprise a computer device, handheld PDA, smart phone or other Internet access device. The user utilises a device 2 to accesses the Internet server 3 over an appropriate access network 4.

In order to obtain access to the resource on server 3, the user initially goes through a registration process. The account registration process is carried out by the Internet server device 3 of FIG. 1.

Figure 2:
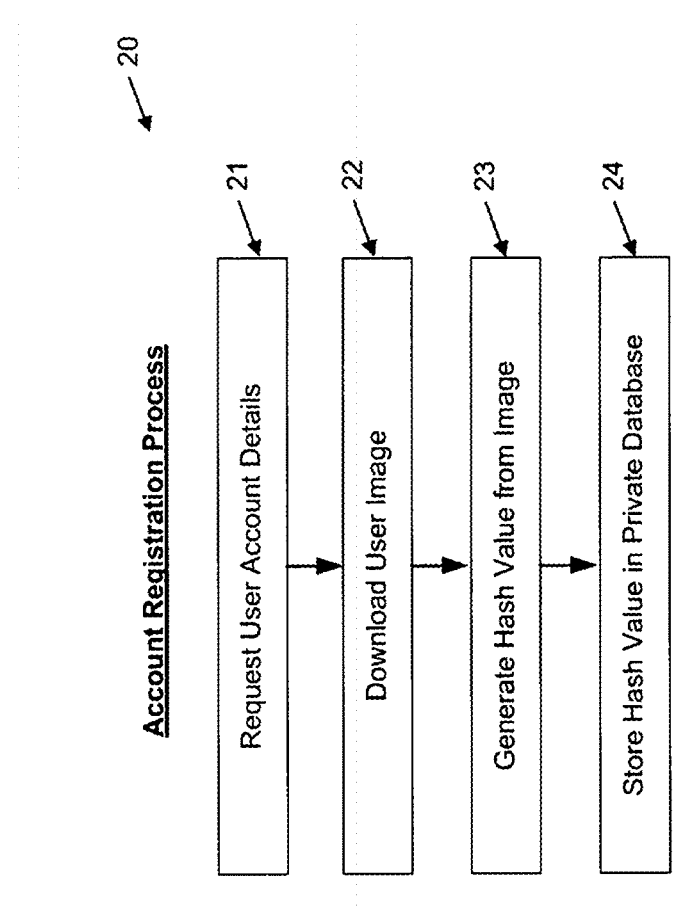
FIG. 2 illustrates a flow chart of the steps of the account registration process of the preferred embodiment.

Turning now to FIG. 2, there is illustrated a flowchart of the steps involved in the account registration process 20. As an initial step 21, the user is requested to fill out their account details. As part of this process, the user is requested to also download from the Internet access device to the Internet server device 3, a user selected image 22.

Upon receipt of the image, the Internet server device calculates a corresponding hash value for the image for its constituent pixels. The calculation of the hash value can proceed through the utilisation of various standardized complex cryptographic algorithms. For example, techniques can include using 256 bit AES, SHA-256 Hashing or MD5 Hashing applied with various stable keys. Once the hash value has been calculated, it is stored 24 in an internal private database by the Internet server device.

After a user has obtained approval and registered their account and been granted access to the corresponding resource, an account access process is executed for accessing account resources.

Figure 3:
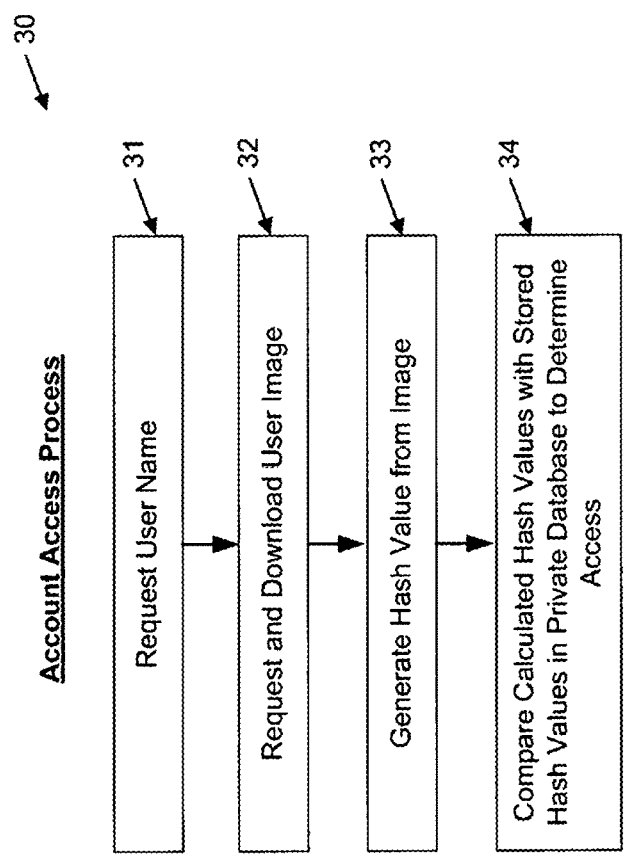
FIG. 3 illustrates a flow chart of the steps in the account access process of the preferred embodiment.

Turning now to FIG. 3, there is illustrated a flowchart of the steps in the account access process 30. This process is carried out by the Internet server device 3 of FIG. 1 whenever a user wishes to access those services provided by the device.

Initially, a web-delivered form is presented for requesting the user's username at step 31. Next, the user is prompted at step 32 to download an image stored on the Internet access device. The requested image is downloaded and the image is used to generate at step 33 a unique hash value utilising the same techniques as those utilised on registration.

Upon obtaining the hash value, the hash value is compared at step 34 with the stored hash value in the private database previously stored. If the two hash values are equivalent, the user is granted access to the resource. The registration process is continued until such time as the user selects a different photograph or image.

The utilization of the system of the preferred embodiment has a number of advantages such as:
 Speed: the time taken to log in is limited to the time taken to select and download the image.
 Ease of use: there is no need to remember passwords.
 Security: access can only be gained by downloading the original photograph.

Modifications to the above methodology are possible. For example, instead of a single hash value being taken of a single image, the image can be broken up into a predetermined number of constituent parts, and each part treated separately, with the final hash value being a combination of the individual hash values.

Further modifications are possible. For example of the multipart image procedure, the following design is evidenced:

Registration Process (Which can occur either at the client or at the server):
 1. Have a user select an image for utilisation and upload;
 2. Store the image data in a contiguous array;
 3. Divide the image into a predetermined number (n) parts or sections (for example n=4);
 4. Determine a corresponding number (n) of internal keys from the server;
 5. Cryptographically Hash each section using a corresponding key a predetermined number (m) of times;
 6. Concatenate the n resultant hash values together to form a final hash value;
 7. Store the final hash value at the server corresponding to the user.

Access Process:

In order to obtain access to the resources, the following steps need to be initiated:
 1. Have a user select an image for utilisation;
 2. Store the image data in a contiguous array;
 3. Divide the image into n parts or sections;
 4. Determine a corresponding n internal keys from the server;
 5. Cryptographically hash each section using a corresponding key m times;
 6. Concatenate the n resultant hash values together to form a final hash value;
 7. Send the final hash value to the server which hosts the database of clients and client hash values;
 8. The server determines a correspondence between the stored database value for a client and a corresponding downloaded resultant hash value, if the hash is the same, it allow access to the system, if not it denies access to the system.

Other modified embodiments are possible. For example, the embodiments can include the incorporation of a one time use pad type environment.

In this arrangement, one time use material (referred to as shared secret data) is distributed in advance between the client and the server.

The one-time password (OTP) system provides the separately shared secret data, a shared counter and a random piece of output. The way one time passwords are generated and validated is as follows.
 1. Users OTP device takes the shared secret and the counter and combines them into a string (S)
 2. (S) is then used to create a random piece of data.
 3. This piece of data is sent to the server, which will perform the same task as the client (using the shared secret and counter) to create the received string and if the result is the same, the client is granted access.

In more detail, the OTP system can proceed via the following steps on the client side:
 1. Get the current 'counter' value (this can be stored locally or on the server)
 2. Ask the user to select their image
 3. Place the image into a variable
 4. Split the variable into n sections (for example n can be four) of varying lengths
 5. Determine n unique keys (These can vary from website to website) and apply each one to a different section;
 6. Cryptographically hash each section individually for m number of times
 7. Concatenate the n hashes and the counter;
 8. Further cryptographically hash the result (using a asymmetric/one way hashing function);
 9. Send the resultant string to the server which hosts the database.

On the server side, the following steps are executed:
 1. A database query is executed to determine the user's image hash and the counter.

2. This data is hashed to re create the process undertaken on the client device.

3. If the computed hash matches the hash received, the user is authenticated. If not, access is denied.

Whilst many other variations are possible, it will be understood that the present invention utilises a user selected data structure, such as an image, audio file, video file etc, to provide access to a resource, thereby alleviating the need to retain passwords or the like.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of providing for access to a computer resource server, over a networked environment, the method including:
   a) providing an initial registration process including identification of a user selected data structure;
   b) distributing a one-time use data structure to a user device and the computer resource server;
   c) modulating the user selected data structure with the one-time use data structure and applying a cryptographic hashing function to the modulated user selected data structure to produce a first derived identifier and a current modulation key;
   d) transmitting the first derived identifier and the current modulation key to the computer resource server; and
   e) upon a user requesting access to the computer resource server, (a) requesting from the user, the first derived identifier and the current modulation key, (b) utilizing (i) the stored one time use data structure, (ii) the current modulation key, and (iii) a copy of the user selected data structure to independently derive a second derived identifier, and (c) comparing the first derived identifier and second derived identifier, and, if they are equivalent, granting the user access to the computer resource server.

2. The method of claim 1, wherein the cryptographic hashing function includes an asymmetric hashing function.

3. The method of claim 1, wherein the user selected data structure comprises a user selected image.

* * * * *